United States Patent [19]
Roden

[11] 3,932,293
[45] Jan. 13, 1976

[54] METALLIC FERROMAGNETIC PARTICLES FOR USE IN ENVIRONMENTALLY STABLE MAGNETIC RECORDING MEDIA

[75] Inventor: John S. Roden, White Bear Lake, Minn.

[73] Assignee: Minnesota Mining and Manufacturing Company, St. Paul, Minn.

[22] Filed: Aug. 28, 1974

[21] Appl. No.: 501,264

Related U.S. Application Data

[63] Continuation of Ser. No. 255,260, May 22, 1972, Pat. No. 3,837,912.

[52] U.S. Cl. ............. 252/62.55; 427/127; 428/403; 428/900; 252/62.54
[51] Int. Cl.²............................................ C09J 5/23
[58] Field of Search........ 117/234, 235, 240, 100 B, 117/100 M, 236–239; 252/62.54, 62.51; 427/127; 428/403

[56] References Cited
UNITED STATES PATENTS

| | | | |
|---|---|---|---|
| 2,809,731 | 10/1957 | Rau............................. | 117/234 X |
| 3,342,587 | 9/1967 | Goodrich et al................ | 117/100 X |
| 3,632,512 | 1/1972 | Miller............................ | 117/100 X |

FOREIGN PATENTS OR APPLICATIONS

| | | | |
|---|---|---|---|
| 761,451 | 11/1956 | United Kingdom.......... | 117/240 UX |
| 963,245 | 7/1964 | United Kingdom.......... | 117/234 UX |

*Primary Examiner*—Bernard D. Pianalto
*Attorney, Agent, or Firm*—Alexander, Sell, Steldt & DeLaHunt

[57] ABSTRACT

Environmentally stable magnetic recording composition comprising fine metal particles based on iron, cobalt, or nickel, the particles having a chromium-based outer layer formed by exposing the particles to a solution containing dichromate or chromate ions under high-shear mixing conditions.

7 Claims, No Drawings

METALLIC FERROMAGNETIC PARTICLES FOR USE IN ENVIRONMENTALLY STABLE MAGNETIC RECORDING MEDIA

REFERENCE TO RELATED APPLICATIONS

This application is a continuation of a pending application, Ser. No. 255,260, filed May 22, 1972, which issued as U.S. Pat. No. 3,837,912 on Sept. 24, 1974.

BACKGROUND OF THE INVENTION

Fine metal particles are recognized to be potentially superior magnetizable pigments for magnetic recording media. One obstacle to fully realizing that potential is the high reactivity of the particles caused by their fine size (they are typically less than 1000–1500 angstroms in diameter). This reactivity makes the particles susceptible to oxidation or other deterioration, even when dispersed in binder material in a magnetic recording medium. The result is that the recording medium may not be environmentally stable; that is, it may lose a substantial percentage of its magnetic properties when stored and used in normal ambient environments.

Several ideas for providing environmental stability have been proposed, but insofar as known none of them gives evidence of real success: either these proposals do not attain a desired level of environmental stability, or they unduly reduce other properties of magnetic recording media incorporating the particles, as by reducing the magnetic properties of the particles. An example of the latter is Little et al, U.S. Pat. 3,535,104, which suggests improving environmental stability by alloying chromium into the particles. The price for that environmental stability is a significant reduction of saturation magnetic moment and other magnetic properties of the alloyed particles (more than 30 percent loss in magnetic moment by adding 20 weight-percent chromium). With such a reduction in the initial or base recording properties of the particles, it makes little difference if those initial properties are substantially retained after environmental exposure; whether or not the properties are retained, the full potential of the fine metal particles is not realized.

SUMMARY OF THE INVENTION

Briefly, a magnetic recording medium of the present invention comprises a magnetizable layer carried on a nonmagnetizable support, the magnetizable layer comprising a nonmagnetizable binder material and, uniformly and thoroughly dispersed in the binder material, fine magnetizable particles that comprise at least 75 weight-percent metal, at least a majority of which is iron, cobalt, or nickel. The invention uses chromium in the particles to provide environmental stability, but this chromium is in an outer chromium-based layer formed by exposing the particles under high-shear conditions to a solution containing dichromate or chromate ions. The chromium-based outer layer appears to be very thin, leaving substantially undisturbed the core of the particles.

The formation of only a thin chromium-based outer layer is suprisingly possible and effective in spite of conditions that exist during the treatment that would be expected to cause an undesirably extensive reaction between the particles and the treating solution. Such conditions include the very high surface area of the particles, the strong oxidizing nature of the treating solution containing dichromate or chromate ions, the strong reducing nature of the fine metal particles, and the very small size of the particles. In fact, the particles are susceptible to being consumed by the treating solution, and will be consumed if the treatment is handled improperly. It is also of interest to note that while the environmental stability of recording media is improved by a treatment of the invention, the pyrophoricity of the particles is apparently not affected by the treatment.

Because the chromium-based outer layer is very thin, the magnetic properties of the particles are substantially not affected by the treatment. Yet the environmental stability of recording media that incorporates the particles in a binder material is greatly improved. As an example of the results achieved, one typical magnetic recording tape comprising fine acicular iron-based particles that carry a chromium-based outer layer of the invention has an initial remanent flux density of 2700 gauss (substantially the same as it would have without the chromium-based outer layer), and yet typically loses essentially none of that remanent flux density in a standard environmental test (such as exposure of the recording tape in a chamber heated to 80°F and having 80 percent relative humidity).

More than that, as an added benefit, it has been found that the chromium-based outer layer on the particles improves the ability of the particles to be dispersed in preferred binder materials. It is thought that the treatment of the particles with the dichromate or chromate solution provides a more uniform surface over a high percentage of the particles, whereupon the particles have a more uniform dispersibility with the binder material. One result of better dispersion is that the "squareness" of the recording medium is generally improved (squareness is the ratio $(M_r/M_m)$ of remanent moment to maximum moment exhibited by the particles in a sample tape; it should be noted that other factors, such as the distribution of particle sizes and magnetic properties, also affect squareness). Also, improved dispersion is believed to contribute to the improved environmental stability exhibited by recording media of the invention; it is hypothesized that, because of the improved dispersibility of the particles in the binder material, a high proportion of the particles are individually covered with binder material, and this individual covering isolates and protects the particles.

All in all, the present invention makes an important contribution to the commercial realization of magnetic recording media that use fine metal magnetizable pigments.

OTHER BACKGROUND PRIOR ART

It is well known to treat metals with solutions containing chromate or dichromate ions to improve the corrosion resistance of the metals. See, for example, *Corrosion and Corrosion Control*, H. H. Uhlig (Wiley) 1963 or *Metallic Corrosion Passivity and Protection*, U. R. Evans (Edward Arnold & Co.) 1937. Also, Bjork, U.S. Pat. No. 3,183,125, suggests that the corrosion resistance of magnesium-based particles can be improved by treating the particles with a heated solution containing dichromate ions. This coating is said to inhibit formation of an oxide coating on the particles that tends to make the particles less effective for use in incendiary or explosive compositions. In a somewhat different teaching, Galmiche, U.S. Pat. No. 3,157,532, suggests improving oxidation-resistance of iron-based magnetic particles by mixing those particles with particles of chromium and chromium halide and heating the mixture to vapor-deposit a chromium-based outer layer on the iron-based particles.

None of these prior teachings suggests that very fine metal particles to be dispersed in binder material in a magnetic recording medium should be surface-treated in the manner of this invention, and none of the prior teachings suggests that such a treatment will maintain the initial magnetic properties of the particles while providing environmental stability for a recording medium in which the particles are incorporated. Further, none of these teachings gives evidence that a treatment of the invention will be effective on very small, highly pyrophoric particles. And, of course, none of the prior teachings suggests that recording properties such as squareness can be improved by such a treatment.

DETAILED DESCRIPTION OF THE INVENTION

Particles useful in the present invention generally comprise at least 75 weight-percent metal ingredients, since the more metal, the higher the magnetic moment of the particles and the more uniform their properties (unless otherwise specified, amounts refer to the whole particle, including the core particle and outer chromium-based layer). Preferably the particles are at least 80 weight-percent metal, and when it can be practicably achieved, 85 or 90 weight-percent or more metal. Of the metal, at least a majority is preferably iron, whereby particles of high coercivity and high magnetic moment may be obtained, and more preferably, at least 75 weight-percent, and even more preferably 85 weight-percent, of the metal is iron. Also useful are particles wherein cobalt or nickel comprises at least a majority, or all, of the metal.

Particles presently preferred for the invention are acicular in order to improve their coercivity.[1] High coercivities make possible high outputs; but the particles may also be made with less than peak coercivity in order to tailor the magnetic recording medium in which they are incorporated to specific jobs.

1. While the term "acicular particle" is used herein, as well as in the prior literature, such "particles" may in fact comprise a linear assemblage of smaller, generally equant particles held together by magnetic forces and acting as a single body for magnetic purposes. The term acicular particle is used herein to describe acicular structures that are mechanically a single particle as well as a magnetic assemblage of several particles, having a length-to-diameter ratio greater than about two, and exhibiting uniaxial magnetic anisotropy; preferred particles have a length-to-diameter ratio greater than four or five.

The coercivity of the acicular particles becomes greater as the average diameter[2] of the particles becomes smaller, except that the particles may become superparamagnetic when of too small a size, which for iron-based particles is about 120 angstroms. To obtain coercivities greater than about 500 oersteds, making the particles useful, for example, in magnetic recording media that can be used in certain newer high-performance recording systems, the particles should have an average diameter less than about 800 angstroms; to obtain coercivities greater than 850 oersteds, making the particles useful in certain kinds of mastering tapes such as used in "contact-duplication" of video tapes, the particles should have an average diameter less than about 450 angstroms; and to obtain coercivities of greater than 1000 oersteds, making the particles useful in magnetic recording media to be used for high-density storage, the particles should have an average diameter less than about 400 angstroms. Larger-size particles, generally up to about 1500 angstroms in average diameter, are also useful for other magnetic recording applications.

2. By "average diameter" is meant the transverse dimension of the acicular particles, which provides a valid indication of the size of acicular particles for most purposes; where an acicular particle comprises an assemblage of generally equant particles, the average diameter of the acicular particles is the average diameter of the generally equant particles in the assemblage.

Inclusion of some cobalt and/or nickel in iron-based particles, especially in acicular iron-based core particles prepared by presently preferred solution-reduction processes using alkali metal borohydride reducing agents, lowers the diameter of the particles, and thus increases coercivity. The diameter is decreased, and thus the coercivity is increased quite significantly by small additions, such as about 0.1 weight-percent, of cobalt or nickel. For the highest coercivities, making possible the highest outputs, at least one, and preferably at least two weight-percent of cobalt and/or nickel is included in iron-based particles. Very little further improvement in coercivity is obtained for amounts of cobalt and/or nickel in excess of about 10 weight-percent of the total metal, and preferably the amount of cobalt and/or nickel in iron-based particles is less than 10 weight-percent of the total metal. Amounts of cobalt or nickel in excess of about 20 or 25 weight-percent of the total metal in iron-based particles result in decreased coercivity and are even less preferred. Further, the inclusion of cobalt or nickel in iron-based particles decreases magnetic moment; nickel decreases magnetic moment more than cobalt does and thus is less desirable than cobalt.

Chromium can also be included in the core particles, generally in amounts less than about 20 weight-percent of the core particle. However, as noted above, such additions reduce the magnetic moment of the particles, and accordingly, as to core or alloy ingredients, particles of the invention preferably include less than 5 or 10 weight-percent chromium, and more preferably are substantially free of chromium; and the preferred values for total chromium, cobalt, and nickel core ingredients in iron-based particles are no more than the preferred maximums for cobalt and/or nickel in iron-based particles given above. In addition to such metals as cobalt, nickel and chromium, certain other metals may be included as core ingredients in particles of the invention. For example, boron is inherently included in particles prepared by a borohydride process.

The core particles which are treated according to the invention may be made by a variety of methods. Solution-reduction methods using alkaline metal borohydrides are presently preferred because average particle size and composition can be readily controlled by these methods. In such methods, solutions of metal salts such as salts of iron, cobalt, nickel, and chromium are mixed with solutions of alkali metal borohydrides such as sodium borohydride, preferably in a high-shear agitator located in a magnetic field of 500 or more oersteds, whereupon a rapid reaction occurs in which acicular metal particles precipitate from the solution. Other recognized procedures for forming metal particle include the decomposition of metal carbonyls in a thermal decomposition chamber, with or without the influence of a magnetic field; the reduction of metal oxide particles as by heating in the presence of a reducing gas; and other solution-reduction techniques.

The solution of chromate or dichromate ions for treating the core particles preferably has a pH between 3 and 5 at the time the particles are introduced into the solution, though solutions having a pH of 2.5 to 7.0 can also give useful results. Solutions that are too acidic, for example, result in solvation of some of the core particles and thus reduce the yield of treated particles. High temperatures for the treating solution also appear to reduce the yield of treated particles, and the temperature of the solution is desirably less than 60°C. A room-temperature solution of potassium dichromate in water appears to give best results, but sodium chromate, or chromic acid can also be used, solutions of the latter generally requiring modification to reduce their acidity to the above ranges.

The core particles should be clean when introduced into the solution of dichromate or chromate ions, with any soluble salts or the like being preferably removed by washing, such as with water, before the particles are introduced into the solution. The particles should be thoroughly agitated during treatment by the solution of dichromate or chromate ions, to increase the uniformity of the treatment. The reaction process proceeds rapidly, generally being completed in about 5 minutes or less. A variety of high-shear mixers such as a Gifford-Wood "Homomixer" can be used.

X-ray analysis of the particles generally fails to detect the presence of any chromium in the treated particles, while electron diffraction analysis does, indicating that the chromium-based layer is very thin. Diffraction analysis indicates that the chromium-based outer layer probably comprises metal chromite having the formula $Me_xCr_{3-x}O_4$, where Me is iron, cobalt or nickel and $x$ is approximately 0.85.

By chemical analysis, it is found that a treatment giving the best results—providing a recording media having good magnetic properties, and stability and providing a high yield of treated particles—deposits about 3 to 5 weight-percent chromium on the particles. The amount of chromium deposited can be adjusted by controlling the number of dichromate or chromate ions in the treating solution. Generally, the desired concentration of dichromate or chromate ions is determined by the desired pH level, and the actual number of dichromate or chromate ions is varied by changing the total volume of the treating bath. More or less chromium than 3 to 5 weight-percent can be applied while still achieving useful results, but if the particles comprise more than about 10 weight-percent chromium after the treatment, it tends to indicate that an uneconomically high proportion of the core particles has been dissolved; on the other hand, if particles having no chromium in the core particle comprise less than about one weight-percent chromium after treatment, the environmental stability of the particles in binder material will be less than desired.

The invention will be further illustrated by the following examples (parts and percents are by weight unless otherwise specified or not appropriate).

EXAMPLE 1

Two solutions are prepared, one comprising 22.9 pounds of $FeSO_4.7H_2O$ (A.R. grade) and 1.91 pounds of $CoSO_4.7H_2O$ (A.R. grade) in 10 gallons of deionized room-temperature water; and the other comprising 6.61 pounds of sodium borohydride (over 98 percent pure, made by Ventron) and 10 gallons of a solution formed by mixing deionized, room-temperature water with about 15 milliliters of a one-molar solution of sodium hydroxide.

The two solutions are then pumped through conduits at equal reactant concentration rates so that they impinge on a 2½ inch-diameter plastic (Teflon) disc which is spinning at about 300 revolutions per minute to assure rapid intimate mixing. The disc is mounted transversely inside a vertical 3-inch-diameter glass tube which, in turn, is located inside the core of a large barium-ferrite permanent magnet so that the magnetic field at the point of impingement is 800 oersteds. The solutions react very rapidly and exothermically to produce a highly viscous slurry containing fine black metal particles and having a temperature of 60°C and a pH of 6. The total time required to pump all of the two solutions together is 40 minutes.

During the reaction period the collected slurry of particles (about 30 gallons) is continuously transferred to a 250-gallon stainless steel wash tank already about four-fifths full of deionized water, which is continually agitated by a propeller mixer. After all of the collected slurry has been transferred to the wash tank, the black metal particles are allowed to settle, after which the liquid above the settled particles, which contains soluble reaction-by-products, is drawn off. The particles are then washed by refilling the vessel with deionized water and drawing the water off a total of 3 times; the conductivity of the final washwater is 340 micromhos, and about 35 gallons of concentrated slurry remains in the bottom of the tank.

A room-temperature solution is then prepared by mixing 0.708 pound of potassium dichromate in 5 gallons of deionized water, and this solution is added to the concentrated slurry, making about 40 gallons of mixture in the tank. This mixture is rapidly agitated using a propeller mixer for 5 minutes, after which it is diluted to 250 gallons by addition of deionized water. The particles are allowed to settle, the water drained off, the sample washed a second time with an equal amount of water, and the second wash water, which has a conductivity of 48 micromhos, removed.

The remaining contents of the tank are pumped into an eight-plate frame and plate press and pressed to a cake about 2.6 gallons in size. Fifteen gallons of technical-grade acetone are pumped through the cake, after which the cake is transferred into three 1-gallon cans which are then placed opened in a vacuum oven. The oven is evacuated to a pressure of about 50 millimeters mercury, heated to 150°C, and held at that temperature for 40 hours. The oven is then allowed to cool to room temperature while maintaining the vacuum, after which the oven pressure is increased to atmospheric pressure by purging the oven with nitrogen gas. At this point the magnetizable particles produced are dry and highly pyrophoric. The oven is opened and the cans quickly covered with lids while a strong nitrogen purge is maintained. The cans are stored in a glove box which is maintained under constant positive nitrogen pressure. Chemical analysis of a sample of the particles reveals that they comprise 73.6 percent iron, 6.6 percent cobalt, 3.58 percent chromium, and 2.02 percent boron.

A dispersion of the particles in binder material is then prepared. First, a 1-gallon porcelain jar mill which contains 28.2 pounds of ¼-inch-diameter steel balls is placed in the glove box, and 1.32 pounds of the dry pyrophoric particles of the invention are transferred from one of the cans into the mill. Next, 42 grams of a tridecyl polyethyleneoxide phosphate ester surfactant having a molecular weight of approximately 700 are added to the mill to act as a dispersant together with 526 grams of benzene. The mill is then sealed, removed from the glove box, and placed on a rotary rack, where the mill is rotated for 48 hours at 65 to 70 percent of critical mill speed.

Meanwhile a solution is prepared comprising the following ingredients:

|  | Grams |
|---|---|
| 30-weight-percent-solids solution of a high-molecular-weight polyester polyurethane polymer synthesized from neopentyl glycol, poly-epsilon-caprolactone diol, and diphenyl urethane di-isocyanate dissolved in dimethyl formamide | 338 |
| Dimethyl formamide | 408 |
| Methyl ethyl ketone | 164 |
| A 55-weight-percent-solids dispersion of fine alumina particles | 27 |
| Fluorochemical surfactant of the type described in U.S. Pat. 3,574,791, Example 17, and useful to provide surface tension control and tape smoothness | 0.08 |

The jar mill is then opened and the above solution added, after which the mill is again sealed, placed back on the rack, and rotated for 18 additional hours. Next, the mill contents are poured into another container and 19 grams of a triisocyanate derivative of toluene diisocyanate and 1-di-(hydroxy methyl)butanol is added to the mixture to promote polymer crosslinking. The magnetizable comprise approximately 44 volume-percent of all of the nonvolatile materials in the mixture.

Immediately after addition of the isocyanate, the dispersion is coated by rotogravure techniques onto a 1-mil-thick, smooth polyethylene terephthalate film which has been primed with para-chlorophenol. The wet coating is then oriented in the longitudinal direction using the 1900-oersted field from a barium-ferrite permanent magnet.

The dried tape is surface-treated or polished by known techniques to give a surface roughness of 2.5–3.0 microinches peak-to-peak (as measured on a Bendix "Proficorder" having a 0.0001-inch-diameter stylus and using a stylus pressure of 20 grams). The coating is post-cured by heating at 230°F for 1 minute followed by 200°F for 1 minute. The tape, in which the magnetizable layer is approximately 130 microinches thick, is then slit into standard tape widths.

The magnetic properties of tape prepared as above measured in the presence of a 3,000-oersted 60-hertz field using an M versus H meter were:

| | | | |
|---|---|---|---|
| $\phi_r$ | = 0.679 lines/¼ inch width of tape | $H_c$ | = 949 oersted |
| $M_r/M_m$ | = 0.809 | $B_r$ | = 3280 gauss |

When subjected to a 100°F, 80-percent-relative-humidity environment for 21 days, the tape lost essentially none of its remanent flux density.

EXAMPLE 2

Six samples of particles were prepared and treated generally as described in Example 1, using a solution of potassium dichromate and particles that comprised 99.9 percent iron and 0.1 percent cobalt. The amount of potassium dichromate used was varied from sample to sample so as to provide different theoretical amounts of chromium on the particles (the theoretical amount is the amount that would be deposited if all the chromium atoms in the solution were deposited on the particles). Sample A was prepared with no potassium dichromate; Sample B with sufficient potassium dichromate to theoretically provide 2 percent chromium; Sample C, 4 percent chromium; Sample D, 6 percent chromium; Sample E, 8 percent chromium; and Sample F, 10 percent chromium.

Each of the samples of treated particles was then incorporated into a magnetic recording tape. First, 16 parts of the particles, 1.1 parts of the phosphate ester surfactant of Example 1, and 4.3 parts of toluene were mixed for 45 minutes in a 5½-ounce "Quickie" mill, Model MG 8600-E; containing 200 parts of ⅛-inch-diameter steel balls. Next 3 parts of a copolymer of vinyl chloride and vinyl acetate (VYHH, from Union Carbide), 1.0 part of dioctyl phthalate, and 16.8 parts of methyl ethyl ketone were added to the mill over a 15-minute period. The resulting mixture was then coated on 1-mil-thick smooth polyethylene terephthalate film by standard laboratory methods.

The proportions and properties of the particles and of the tape were as follows:

| Sample No. | $M_r/M_m$ | $H_c$ (oersteds) | $B_r$ (gauss) | Percent iron | Percent cobalt | Percent chromium | $\alpha_s$ (emu/g) |
|---|---|---|---|---|---|---|---|
| A | 0.773 | 572 | 2280 | 93.26 | 0.097 | 0.06* | 152 |
| B | 0.819 | 553 | 2740 | 89.35 | 0.093 | 1.55 | 148 |
| C | 0.809 | 529 | 2660 | 87.76 | 0.09 | 3.10 | 149 |
| D | 0.770 | 534 | 2330 | 89.01 | 0.091 | 3.24 | 149.5 |
| E | 0.819 | 553 | 2680 | 85.96 | 0.093 | 3.55 | 150 |
| F | 0.814 | 560 | 2670 | 85.66 | 0.088 | 3.78 | 142 |

*Trace impurity in iron and cobalt

The environmental stability of the tapes was measured by a severe test useful to discriminate between different degrees of environmental protection comprising exposure of the tapes to temperatures of 100°C for 21 days. Results were as follows:

| Sample No. | Percent of $B_r$ retained (%) |
|---|---|
| A | 86 |
| B | 90 |
| C | 94 |
| D | not tested[3] |
| E | not tested |
| F | 96 |

[3]Because of the similarity of Samples D and E to Sample C

The smoothness of the recording tapes prepared from particles of Samples A, B, and C was also measured, the processing conditions (tape polishing apparatus not used) and binder material for all the tapes being the same. For Sample A the peak-to-peak roughness of the exterior surface of the magnetizable layer was 50 microinches, for Sample B the peak-to-peak roughness was 25 microinches, and for Sample C the peak-to-peak roughness was 30 microinches.

EXAMPLE 3

Five different samples of five magnetizable iron-based particles, Samples A-E, were prepared generally as described in Example 1 except for changes in the time at which the potassium chromate was applied as noted below. FeCl$_2$.4H$_2$O and CoCl$_2$.6H$_2$O were used in proportions such as to provide a ratio of iron to cobalt of about 95 to 5. Sample A was prepared without any chromium treatment; Sample B was prepared by using a solution of potassium dichromate in a wash tank after the particles have been washed with water in the manner of Example 1; Sample C was prepared by using a solution of potassium dichromate in a wash tank after the particles have been washed with water in the manner of Example 1; Sample D was prepared by using a solution of potassium dichromate in a wash tank agitated with a high-shear mixer; and Sample E was prepared by using a solution of sodium chromate in the collecting vessel.

The particles were then incorporated into magnetic recording tapes in the manner described in Example 2, and the properties and proportions and the particles and properties of the tape found to be as follows:

| Sample No. | $M_r/M_m$ | $H_c$ (oersteds) | $B_r$ (gauss) | Percent iron | Percent cobalt | Percent chromium |
|---|---|---|---|---|---|---|
| A | 0.828 | 1170 | 2810 | 78.7 | 4.1 | 0.1* |
| B | 0.874 | 1290 | 2590 | 67.3 | 3.5 | 1.6 |
| C | 0.829 | 1260 | 1870 | 74.3 | 3.9 | 2.2 |
| D | 0.878 | 1260 | 2340 | 71.5 | 3.7 | 3.4 |
| E | 0.838 | 1260 | 2460 | 77.3 | 3.8 | 0.9 |

*Trace impurity in iron and cobalt

EXAMPLE 4

Particles were prepared generally as described in Example 1 using FeCl$_2$.4H$_2$O and CoCl$_2$.6H$_2$O in proportions such as to provide a ratio of iron to cobalt of about 95 to 5, the particles being treated by a solution of potassium dichromate in a wash tank agitated by a high-shear mixer with sufficient potassium dichromate included in the solution to theoretically provide 5 percent chromium on the particles. Three samples were prepared, each using a dichromate solution having a different pH. Sample A used a solution having a pH of 2.1 (obtained by modifying the solution with concentrated hydrochloric acid); Sample B used the potassium dichromate solution unmodified, which had a pH of 4.3; and Sample C used a solution having a pH of 7.0 (obtained by modifying the solution with sodium hydroxide). The particles and tape prepared from the particles as in Example 2 exhibited the following properties ("yield" is the weight of particles produced in the process divided by the weight of particles that should theoretically be obtained from the amounts of iron and cobalt salts in the original reaction, multiplied by 100):

| Sample No. | $M_r/M_m$ | $H_c$ (oersteds) | $B_r$ (gauss) | Percent iron | Percent cobalt | Percent chromium | $\alpha_s$ (emu/g) | Yield (%) |
|---|---|---|---|---|---|---|---|---|
| A | 0.858 | 945 | 2580 | 70.5 | 4.0 | 8.0 | 91.0 | 50 |
| B | 0.858 | 907 | 3150 | 77.8 | 4.7 | 4.1 | 128.6 | 67 |
| C | 0.855 | 956 | 2700 | 80.5 | 4.5 | 3.9 | 134.8 | 67 |

EXAMPLE 5

The procedure of Example 4 was repeated except that the original particles contained only 0.1 weight-percent cobalt and sufficient potassium dichromate was included in the solution to theoretically provide 10 percent chromium on the particles. Sample A was prepared using a solution having a pH of 3.0 (obtained by modifying the solution with sulfuric acid); Sample B was prepared using a solution having a pH of 2.5 (obtained by adjusting the solution with hydrochloric acid); and Sample C was prepared using a solution having a pH of 2.5 (obtained by modifying the solution with sulfuric acid). The particles exhibited the following properties:

| Sample No. | $M_r/M_m$ | $H_c$ (oersteds) | $B_r$ (gauss) | Percent iron | Percent cobalt | Percent chromium |
|---|---|---|---|---|---|---|
| A | 0.784 | 603 | 2300 | 81.9 | 0.078 | 3.77 |
| B | 0.774 | 610 | 1820 | 77.9 | 0.076 | 6.67 |
| C | 0.798 | 612 | 2080 | 81.0 | 0.077 | 7.08 |

EXAMPLE 6

A series of samples were made generally as described in Example 1 using a solution of sodium chromate as the treating solution. Samples A, B, and C were made using particles comprising theoretically 100 percent iron (except for boron and other impurities introduced in the preparation of the particles). Sampel A used sufficient sodium chromate to theoretically deposit 1 percent chromium; Sample B, 5 percent chromium; and Sample C, 10 percent chromium. Samples D, E, and F were made using particles comprising iron and cobalt in a theoretical 95 to 5 ratio. Sample D used sufficient sodium chromate to theoretically deposit 1 percent chromium; Sample E, 5 percent chromium; and Sample F, 10 percent chromium. Since the particles of Samples D-F included cobalt while those of Samples A-C did not, the particles of Samples D-F were smaller and had a larger surface area. The particles and tape prepared from the particles as described in Example 2 exhibited the following properties:

| Sample No. | $M_r/M_m$ | $H_c$ (oersteds) | $B_r$ (gauss) | Percent iron | Percent cobalt | Percent chromium |
|---|---|---|---|---|---|---|
| A | 0.786 | 468 | 2700 | 87.4 | <0.01 | 0.76 |
| B | 0.798 | 477 | 2560 | 83.4 | <0.01 | 2.46 |
| C | 0.790 | 447 | 2610 | 82.5 | <0.01 | 3.35 |
| D | 0.82 | 1210 | 2680 | 84.1 | 4.22 | 0.78 |
| E | 0.83 | 1140 | 2720 | 75.7 | 4.02 | 3.23 |
| F | 0.85 | 1160 | 2870 | 63.1 | 3.45 | 4.68 |

EXAMPLE 7

Three different samples of fine acicular magnetizable particles comprising iron and cobalt in an approximate 99.9 to 0.1 ratio which had been prepared by the general procedure described in Example 1, except that the core particles were dried after preparation and then stored for some time so that they did not have a nascent surface when treated with a solution of dichromate ions. A 0.01-molar solution of potassium dichromate having a pH of 4.3 was used to provide the dichromate ions, and a different solution temperature was used for each of the samples; for Sample A, the temperature was 22°C; for Sample B, 55°C; and for Sample C, 90°C. The properties and proportions of particles and the properties of tape made from the particles in the manner described in Example 2 were as follows:

| Sample No. | $\alpha$ (emu/g) | $B_r$ (gauss) | $H_c$ (oersteds) | Percent iron | Percent cobalt | Percent chromium |
|---|---|---|---|---|---|---|
| A | 114 | 1705 | 686 | 86.9 | 0.15 | 0.58 |
| B | 102 | 1870 | 682 | 77.8 | 0.15 | 1.35 |
| C | 73.1 | 1430 | 681 | 57.6 | 0.11 | 3.3 |

By comparison of these results with the results of other examples, it will be seen that best effects are obtained when the invention is practiced with particles that have been prepared immediately prior to treatment with a solution containing dichromate or chromate ions.

What is claimed is:

1. Fine magnetizable particles useful in the magnetizable layer of a magnetic recording medium to provide magnetic recording characteristics of improved environmental stability, said particles comprising at least 75 weight-percent metal, at least a majority of which is iron, cobalt, or nickel, and having a thin outer layer that comprises a chromium- and oxygen-containing compound and is formed by exposing the particles under high-shear mixing conditions to a solution containing dichromate or chromate ions and having a pH of up to 7.0, the amount of chromium in said thin outer layer comprising between about 1 and 10 percent of the total weight of the particles.

2. Magnetizable particles of claim 1 in which the amount of chromium in said thin outer layer comprises between about 3 and 5 percent of the total weight of the particles.

3. Magnetizable particles of claim 1 in which at least a majority of the metal is iron and 0.1 to 10 weight-percent of the metal is cobalt.

4. Magnetizable particles of claim 1 in which the particles have an average diameter of less than about 800 angstroms.

5. A slurry containing magnetizable particles of claim 1.

6. Fine magnetizable particles useful in the magnetizable layer of a magnetic recording medium to provide magnetic recording characteristics of improved environmental stability, said particles having an average diameter less than about 800 angstroms, comprising at least 75 weight-percent metal, at least 75 percent of which is iron, and having a thin outer layer that comprises a chromium- and oxygen-containing compound and that is formed by exposing the particles under high-shear mixing conditions to a solution containing dichromate or chromate ions and having a pH of up to 7.0, the amount of chromium in said outer layer averaging between about 3 and 5 percent of the weight of the particles.

7. A slurry containing magnetizable particles of claim 6.

* * * * *